(12) United States Patent
Kurosaki

(10) Patent No.: US 10,953,427 B2
(45) Date of Patent: Mar. 23, 2021

(54) ADHESIVE APPLICATION DEVICE AND ADHESIVE APPLICATION METHOD

(71) Applicant: TANAKA SEIMITSU KOGYO CO., LTD., Toyama (JP)

(72) Inventor: Eiichi Kurosaki, Toyama (JP)

(73) Assignee: TANAKA SEIMITSU KOGYO CO., LTD., Toyama (JP)

(*) Notice: Subject to any disclaimer, the term of this patent is extended or adjusted under 35 U.S.C. 154(b) by 0 days.

(21) Appl. No.: 16/977,140

(22) PCT Filed: Feb. 27, 2019

(86) PCT No.: PCT/JP2019/007538
§ 371 (c)(1),
(2) Date: Sep. 1, 2020

(87) PCT Pub. No.: WO2019/168022
PCT Pub. Date: Sep. 6, 2019

(65) Prior Publication Data
US 2021/0031227 A1 Feb. 4, 2021

(30) Foreign Application Priority Data

Mar. 2, 2018 (JP) .............................. JP2018-037679
Oct. 3, 2018 (JP) .............................. JP2018-188477

(51) Int. Cl.
*B05C 5/00* (2006.01)
*B05C 11/10* (2006.01)
(Continued)

(52) U.S. Cl.
CPC .................. *B05C 9/14* (2013.01); *B05C 5/02* (2013.01); *B05C 11/1042* (2013.01);
(Continued)

(58) Field of Classification Search
None
See application file for complete search history.

(56) References Cited

U.S. PATENT DOCUMENTS 4,522,875 A * 6/1985 Still, Jr. .................. B29B 15/12
442/169
2012/0248901 A1 10/2012 Maeda et al.
(Continued)

FOREIGN PATENT DOCUMENTS

JP 5-304037 11/1993
JP 2001-25218 1/2001
(Continued)

OTHER PUBLICATIONS

English Translation of International Preliminary Report on Patentability dated Sep. 8, 2020 in corresponding International (PCT) Application No. PCT/JP2019/007538.
(Continued)

*Primary Examiner* — Jethro M. Pence
(74) *Attorney, Agent, or Firm* — Wenderoth, Lind & Ponack, L.L.P.

(57) ABSTRACT

Provided are an adhesive application device and method used in the production of a laminated core, wherein the device and method are capable of stably applying an adhesive to a thin steel strip regardless of the transfer speed of the thin steel strip that is to be punched, and contribute to the improvement of the productivity of a laminated core.

9 Claims, 7 Drawing Sheets

(51) Int. Cl.
    *B05C 13/02*   (2006.01)
    *B05D 1/26*    (2006.01)
    *B05D 3/00*    (2006.01)
    *B05C 9/14*    (2006.01)
    *B05C 5/02*    (2006.01)
    *B05D 7/24*    (2006.01)
    *B05D 7/14*    (2006.01)

(52) U.S. Cl.
    CPC ............. *B05C 13/02* (2013.01); *B05D 1/26* (2013.01); *B05D 7/14* (2013.01); *B05D 7/24* (2013.01)

(56) References Cited

U.S. PATENT DOCUMENTS

| 2017/0201163 A1* | 7/2017 | Chung, II | H02K 1/12 |
| 2017/0214300 A1 | 7/2017 | Chung et al. | |
| 2017/0282206 A1* | 10/2017 | Kobayashi | B05D 1/28 |
| 2017/0297078 A1 | 10/2017 | Nishinaka | |

FOREIGN PATENT DOCUMENTS

| JP | 2001-321850 | 11/2001 |
| JP | 2003-33711 | 2/2003 |
| JP | 2009-124828 | 6/2009 |
| JP | 5160862 | 3/2013 |
| JP | 5576460 | 8/2014 |
| JP | 2015-198602 | 11/2015 |
| JP | 5890476 | 3/2016 |
| WO | 2015/030168 | 3/2015 |

OTHER PUBLICATIONS

International Search Report (ISR) dated May 21, 2019 in International (PCT) Application No. PCT/JP2019/007538.

* cited by examiner

[Fig. 1]
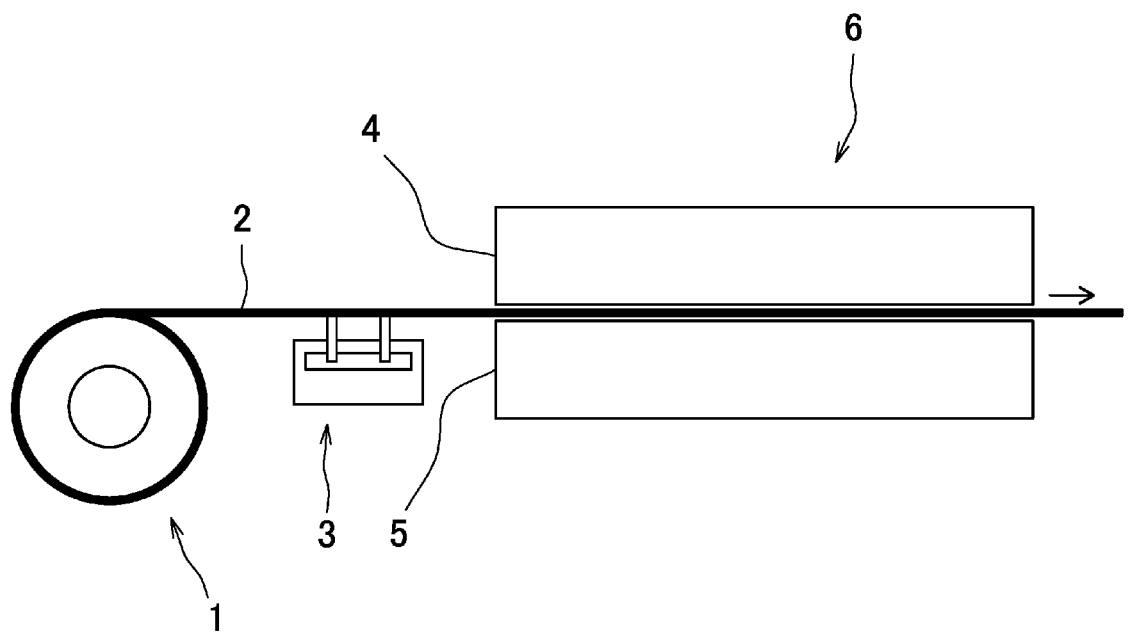

[Fig. 2]
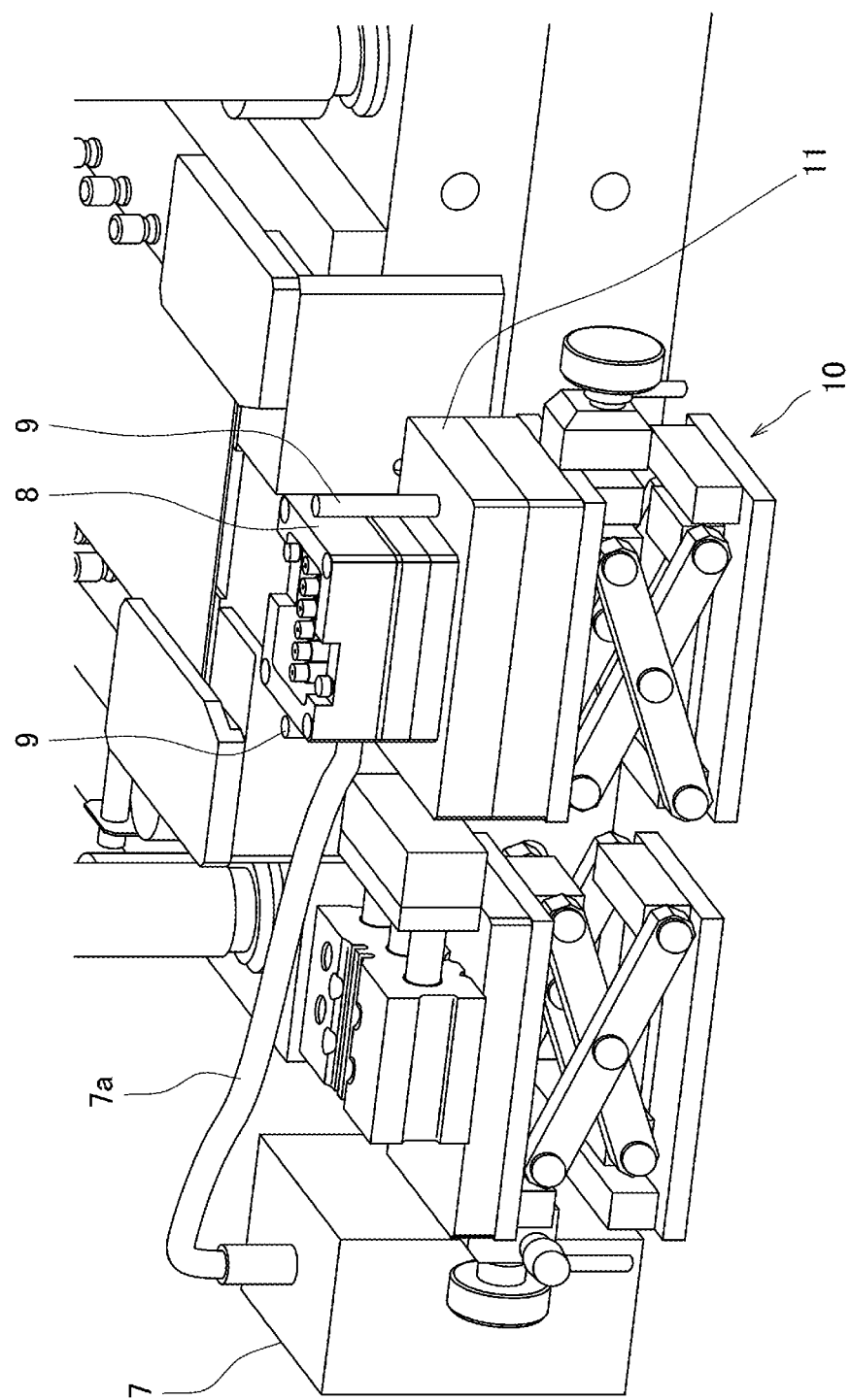

[Fig. 3]
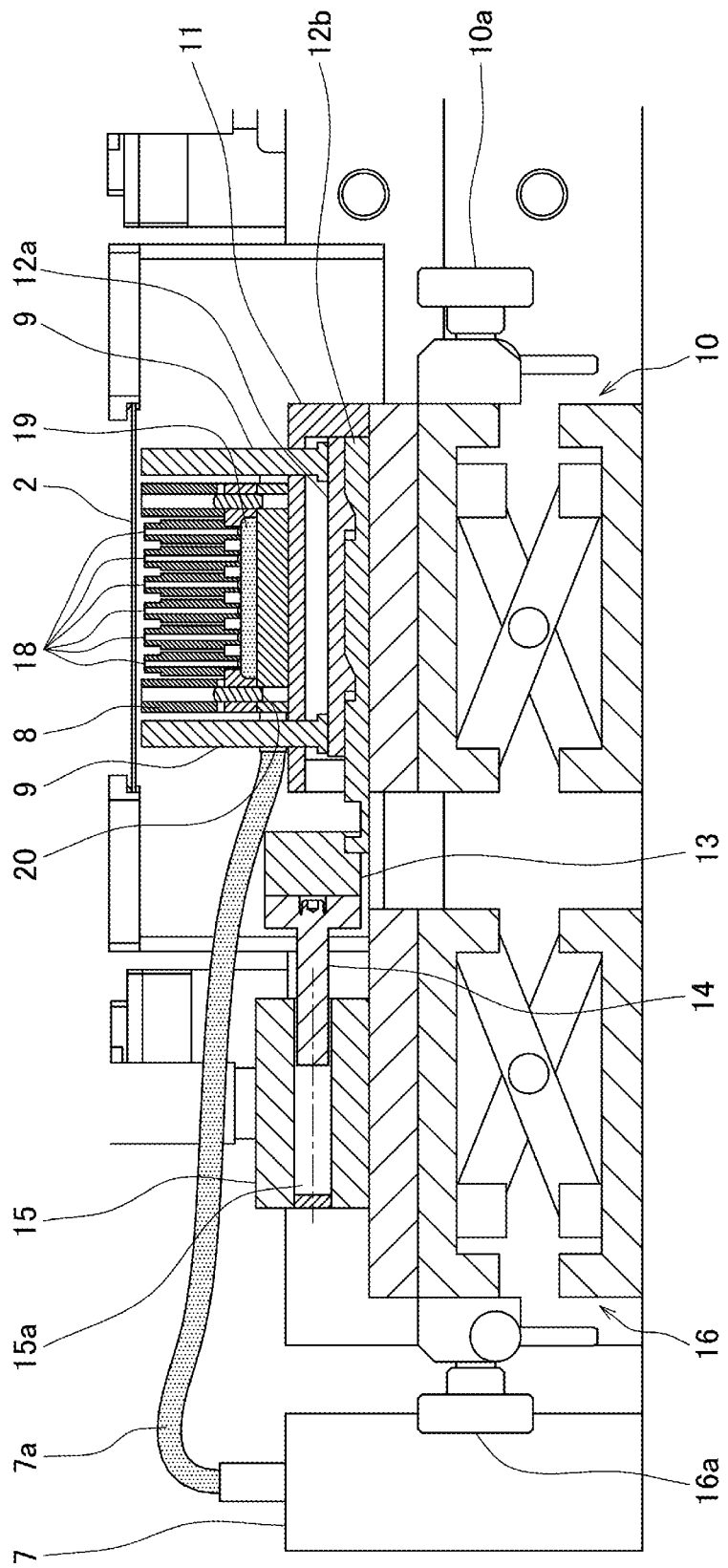

[Fig. 4]
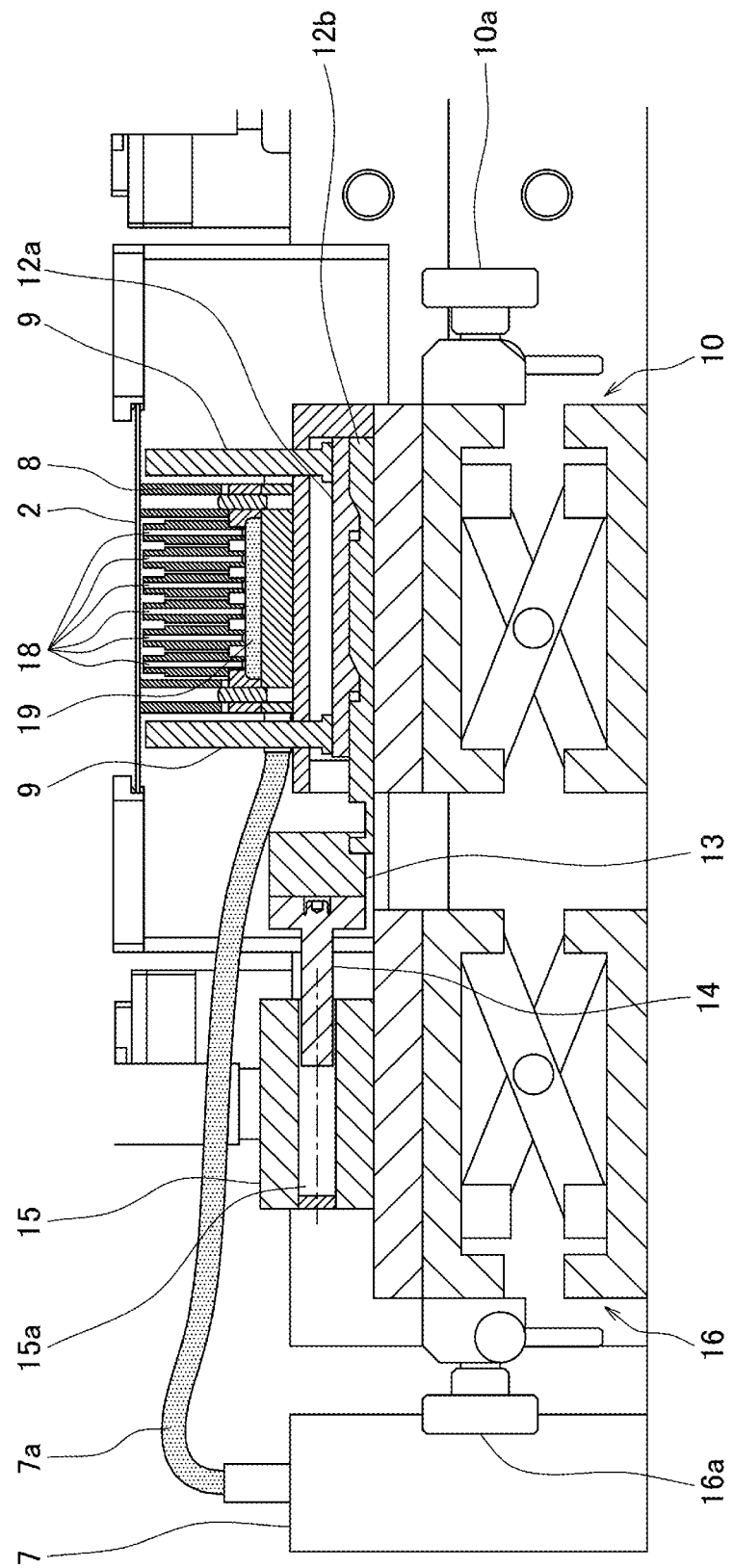

[Fig. 5]
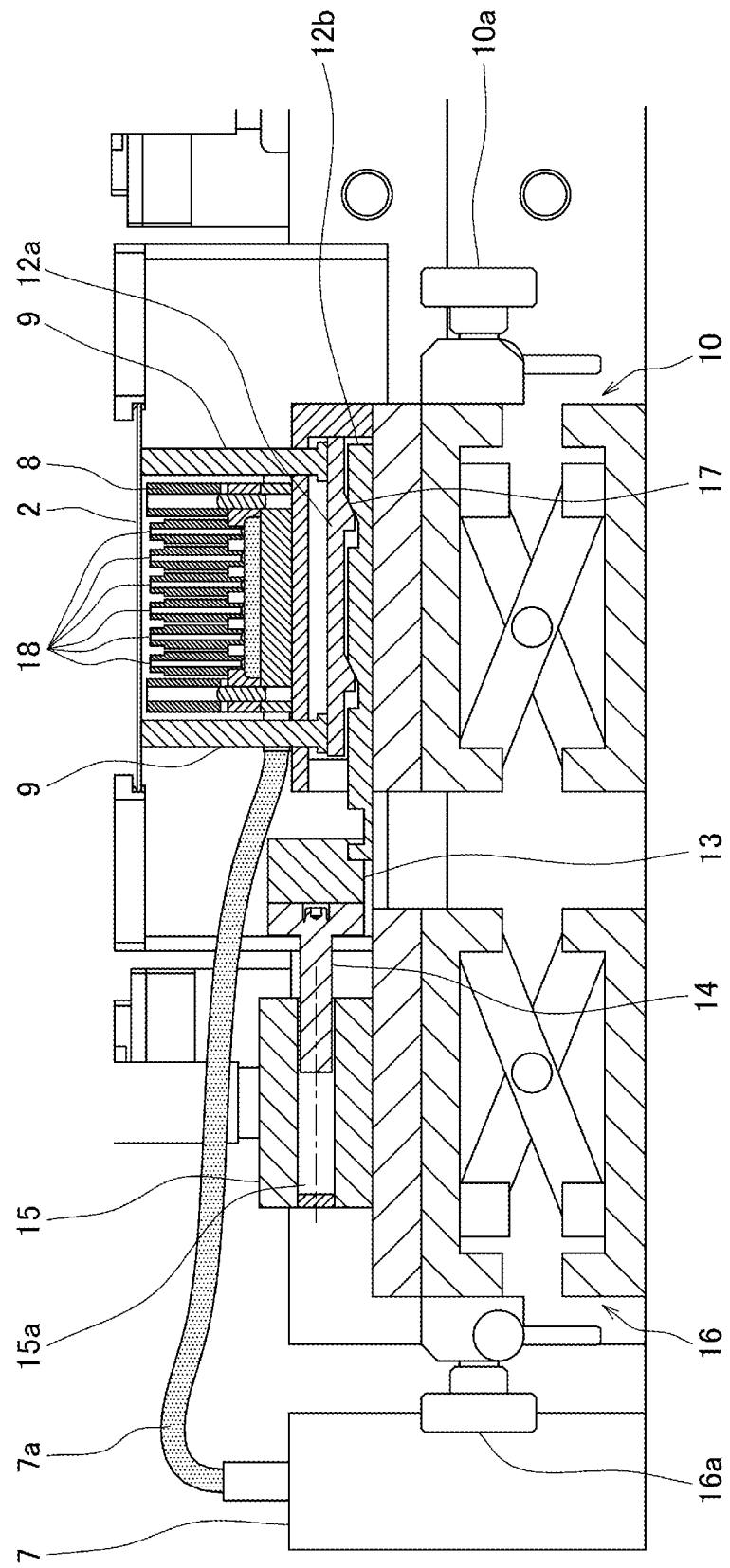

[Fig. 6A]
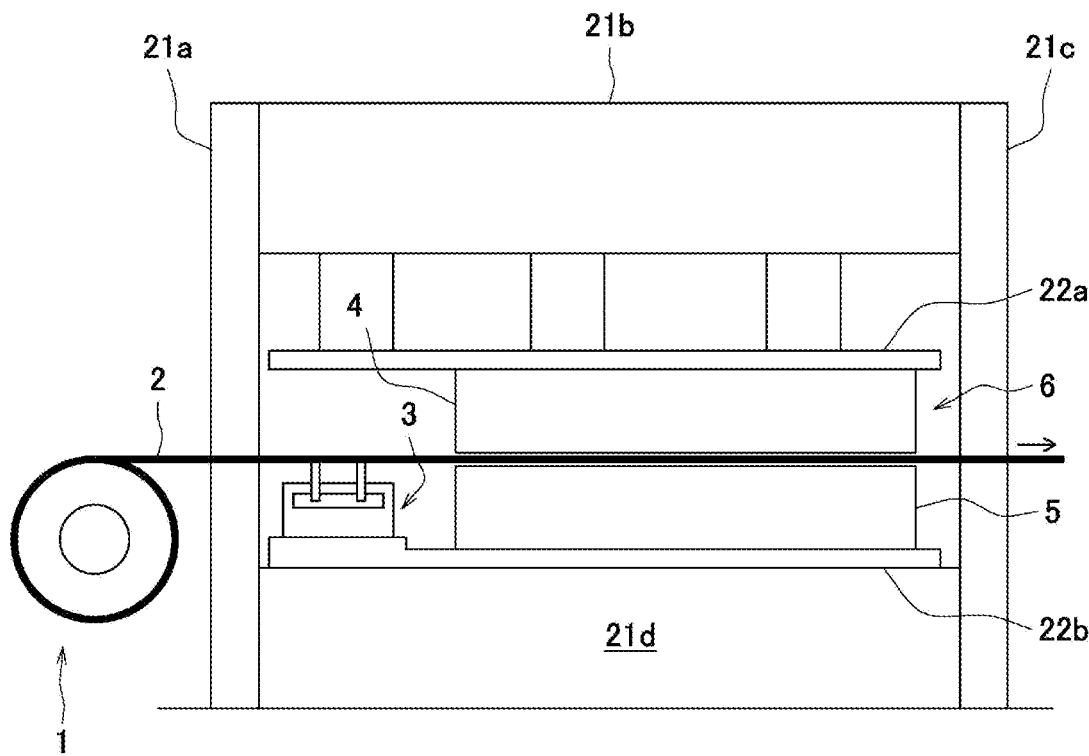
[Fig. 6B]
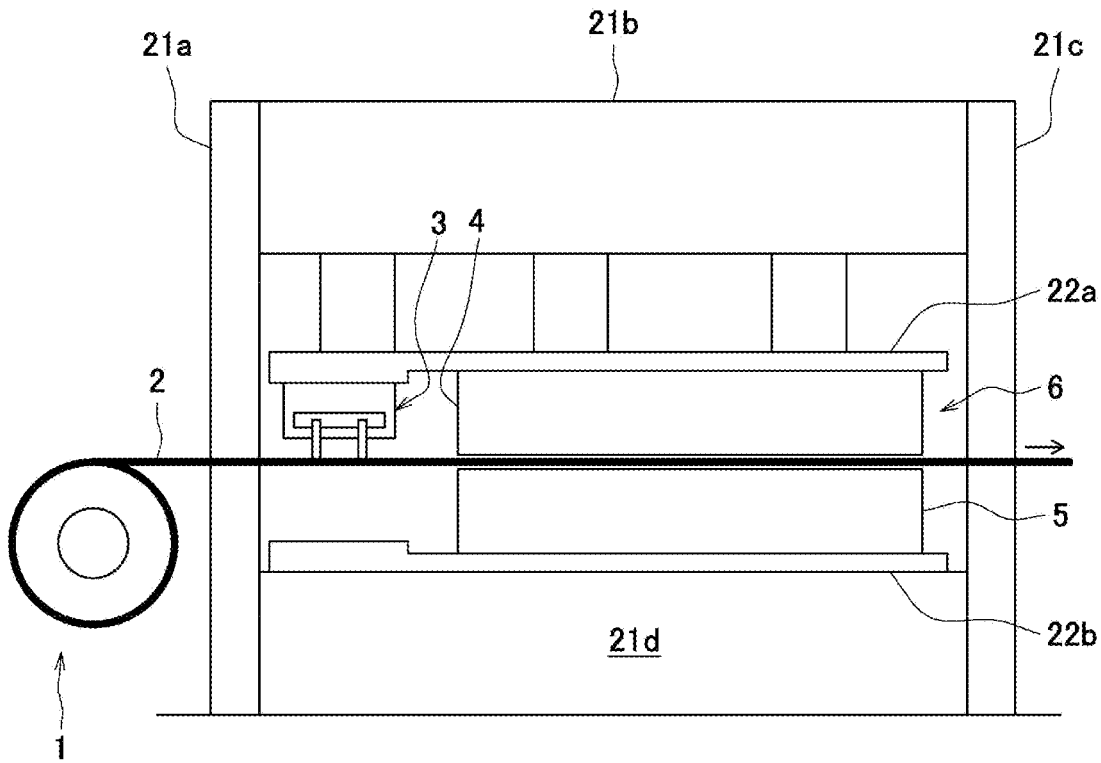

[Fig. 7]
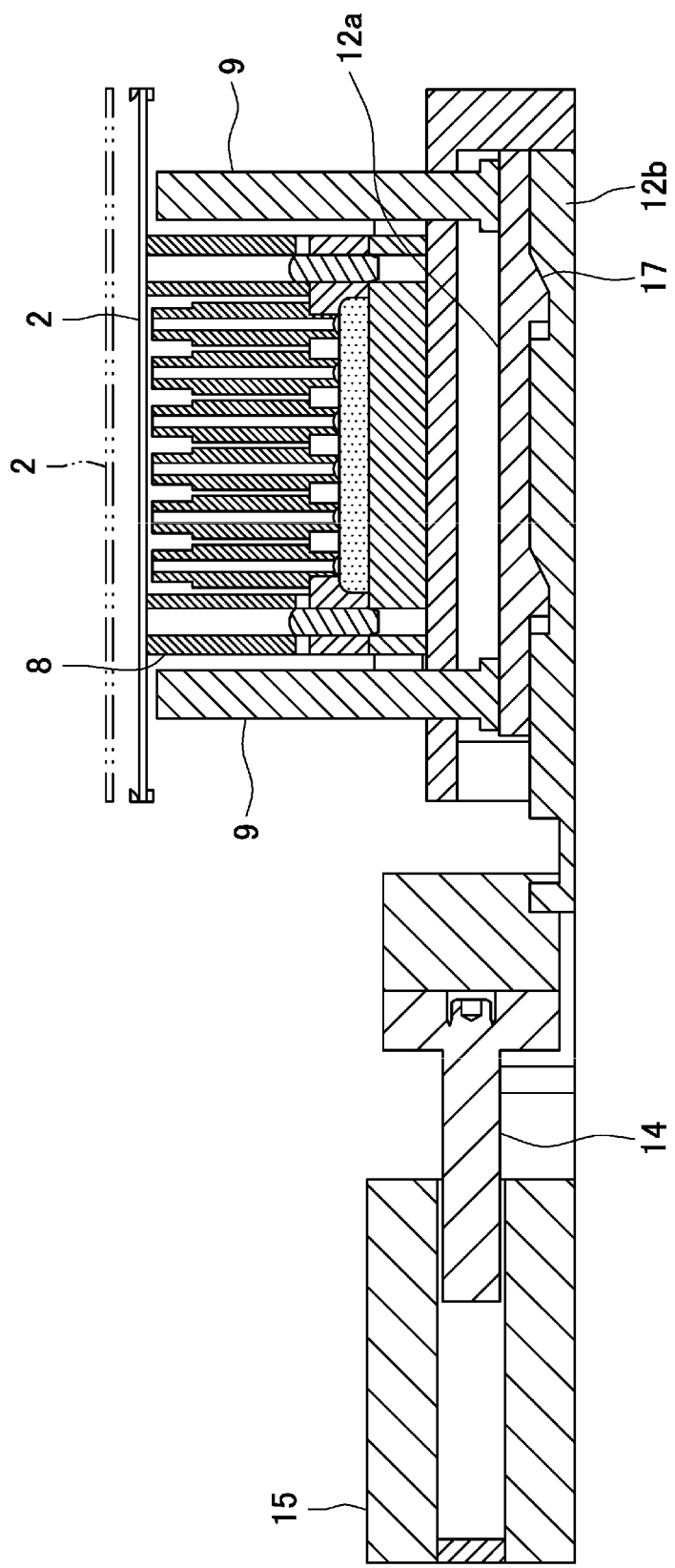

ADHESIVE APPLICATION DEVICE AND ADHESIVE APPLICATION METHOD

TECHNICAL FIELD

The present invention relates to an adhesive application device and an adhesive application method.

The present invention relates to an adhesive application device and method used in the production of a laminated core for a stator or a rotor of a rotating electric machine. In particular, the present invention relates to an adhesive application device and method used to stack and bond core sheets with a predetermined shape produced from a thin steel strip by punching.

BACKGROUND ART

Laminated cores for rotating electric machines are generally manufactured by using an electromagnetic steel hoop (a thin steel strip) as a material and feeding a thin steel strip to a progressive die apparatus. In the die apparatus, a thin steel strip is subjected to successive punching processes to create a predetermined shape, such as pilot holes, slots and inner teeth, to thereby produce core sheets in a sequential manner. Then, a predetermined number of the core sheets are stacked and assembled together to form a laminated core. The core sheets are conventionally assembled together by lamination interlocking, in which core sheets are provided with projections and recesses for interlocking and stacked and interlocked together under pressure, or lamination welding, in which core sheets are stacked and welded together by laser. However, these lamination techniques suffer from the drawback of deterioration of the magnetic properties at the interlocking locations or the welded locations. Under these circumstances, lamination bonding has been widely proposed as an alternative technique, in which an adhesive is applied to the surface of a thin steel strip in a die apparatus, and the thin steel strip is punched to create a plurality of core sheets, and the core sheets are stacked and bonded together to form a laminated core (Patent literatures 1 and 2).

An adhesive feeding device for lamination bonding has been reported, which comprises, for example, a cylinder that is vertically slidably held in a lower die in a press forming line, a plurality of adhesive transfer nozzles mounted at the tip of the cylinder, a storage chamber defined by the inner surface of the tip of the cylinder and operable to store an adhesive liquid supplied at a predetermined pressure through an adhesive liquid supply passage, a piston slidably mounted within the cylinder and operable to push the adhesive liquid stored in the storage chamber in the direction toward the adhesive transfer nozzles, wherein an upper die of a press forming machine is lowered to push the piston against the tip of the cylinder to raise the position of the piston relative to the cylinder, thereby allowing the adhesive liquid to be dispensed from the transfer nozzles to a core sheet (see Patent literature 3).

In the adhesive feeding device of Patent literature 3, the relative movement of the cylinder and the piston for dispensing the adhesive liquid is achieved by the vertical movement of the ram (die) of the press forming machine. When the speed of the pressing stroke is increased, the speed of dispense of the adhesive liquid from the transfer nozzles to the core sheet will be increased. If the speed of the pressing stroke exceeds the threshold, an excessive amount of the adhesive liquid may be dispensed from the transfer nozzles, and as a result, the bonding strength may vary, and the adhesive liquid may be scattered around and cause harmful influence on, for example, the dies. Therefore, in the adhesive feeding device of Patent literature 3, the speed of the pressing stroke needs to be set within the range that allows the adhesive liquid to be appropriately transferred to the core sheet. In this manner, the acceleration of the pressing stroke is restricted to some extent. Similar problems may occur when an adhesive feeding device has a piston that is moved directly by the vertical movement of a ram.

To address the above problems, various types of manufacturing machines for laminated cores have been proposed in which adhesive application is performed regardless of the transfer speed of a thin steel strip during the punching process (Patent literatures 4, 5 and 6).

CITATION LIST

Patent Literature

Patent literature 1: JP 2001-25218 A
Patent literature 2: JP 2001-321850 A
Patent literature 3: JP 2003-33711 A
Patent literature 4: JP patent No. 5160862
Patent literature 5: JP patent No. 5576460
Patent literature 6: JP patent No. 5890476

SUMMARY OF INVENTION

Technical Problem

In the manufacturing machines for laminated cores as described in Patent literatures 4 to 6, however, a device for applying an adhesive to a thin steel strip is mounted inside of a die apparatus. This configuration makes it difficult to examine whether an adhesive is applied in a predetermined amount or to adjust the amount of the adhesive applied, and is thus disadvantages for the maintenance of the adhesive application device. Consequently, when troubles occur during the manufacturing process, appropriate recovery procedures are extremely difficult to perform. In the manufacturing machine for laminated cores as described in Patent literature 4, when a hoop 1 is brought into abutment with an upper surface 11a of a lower die 11, an adhesive dispensed from a dispense nozzle 62 is applied to a lower surface of the hoop 1. When the adhesive is not desired to be applied to the lower surface of the hoop 1, a drive device 92 drives a drive member 91 to retract and allows a cam surface 91a of the drive member 91 to engage with a cam surface 41a of a base body 41, and an adhesive dispense unit 31 is lowered to the lower limit position, thereby preventing the application of the adhesive to the lower surface of the hoop 1. In short, the manufacturing machine for laminated cores described in Patent literature 4 utilizes the upward and downward movement of the adhesive dispense unit 31 to apply the adhesive to the lower surface of the hoop 1. Due to this upward and downward movement of the adhesive dispense unit 31, the cam surface 91a and the cam surface 41a gradually wear out, and as a result, the amount of the adhesive applied to the lower surface of the hoop 1 may vary. In addition, when a plurality of the dispense nozzles 62 are provided in the manufacturing machine for laminated cores described in Patent literature 4, a slight inclination of an adhesive introducing block 43 may disadvantageously cause variations in the distance between the dispense nozzles 62 and the lower surface of the hoop 1 again due to the upward and downward movement of the adhesive dispense unit 31.

The present invention relates to an improved device and method to solve the above problems in the conventional art. Thus an object of the present invention is to provide an adhesive application device and method used in the production of a laminated core, wherein the device and method are capable of stably applying an adhesive to a thin steel strip regardless of the transfer speed of the thin steel strip that is to be punched, and contribute to the improvement of the productivity of a laminated core.

Solution to Problem

A first aspect of the present invention for solving the above problems relates to a device for applying an adhesive to a thin steel strip that is to be punched into core sheets with a predetermined shape in a die apparatus to stack and bond core sheets together, the device comprising an adhesive dispense unit comprising a dispense nozzle for dispensing an adhesive to an adhesive application surface of a thin steel strip, an adhesive container that accommodates the adhesive dispense unit, and an adhesive supply unit for supplying the adhesive at a predetermined pressure to the adhesive dispense unit, wherein the adhesive dispense unit is fixed to the adhesive container, wherein the dispense nozzle for dispensing the adhesive is disposed inside the adhesive container to be spaced apart from an end face of the adhesive container that is brought into abutment with the adhesive application surface of the thin steel strip, wherein the adhesive application is performed in a location other than the die apparatus, and wherein the thin steel strip is brought into abutment with the adhesive container, and the adhesive dispensed from the dispense nozzle is applied to the thin steel strip in synchronization with the timing of punching of the thin steel strip into core sheets with a predetermined shape in the die apparatus.

A second aspect of the present invention relates to the adhesive application device as described above, wherein the adhesive container is disposed above or below the thin steel strip.

A third aspect of the present invention relates to the adhesive application device as described above, which further comprises a means capable of raising and lowering the thin steel strip without raising or lowering the adhesive container.

A fourth aspect of the present invention relates to the adhesive application device as described above, wherein the adhesive container comprises a plurality of dispense nozzles, and an adhesive pool that communicates with the plurality of dispense nozzles.

A fifth aspect of the present invention relates to the adhesive application device as described above, which further comprises an elevating device configured to raise and lower the adhesive container together with the means capable of raising and lowering the thin steel strip.

A sixth aspect of the present invention relates to the adhesive application device as described above, wherein the adhesive container comprises a heating element.

A seventh aspect of the present invention relates to a method for applying an adhesive to a thin steel strip that is to be punched into core sheets with a predetermined shape in a die apparatus to stack and bond core sheets together, wherein the adhesive application is performed with a device comprising an adhesive dispense unit comprising a dispense nozzle for dispensing an adhesive to an adhesive application surface of a thin steel strip, an adhesive container that accommodates the adhesive dispense unit, an adhesive supply unit for supplying the adhesive at a predetermined pressure to the adhesive dispense unit, and a means capable of raising and lowering the thin steel strip without raising and lowering the adhesive container to prevent an unnecessary adhesive from being applied to the thin steel strip, wherein the adhesive dispense unit is fixed to the adhesive container, and wherein the dispense nozzle for dispensing the adhesive is disposed inside the adhesive container to be spaced apart from an end face of the adhesive container that is brought into abutment with the adhesive application surface of the thin steel strip, the method comprising bring the thin steel strip into abutment with the adhesive container, and applying the adhesive dispensed from the dispense nozzle to the thin steel strip in a location other than the die apparatus in synchronization with the timing of punching of the thin steel strip into core sheets with a predetermined shape in the die apparatus.

Advantageous Effects of Invention

According to the first, second and seventh aspects of the present invention, the distance between the upper or lower surface of the thin steel strip and the tip of the dispense nozzle at the timing of punching the thin steel strip is kept constant, and the amount of the adhesive that rises on the dispense nozzle is substantially constant, and therefore a substantially constant amount of the adhesive is applied to the upper or lower surface of the thin steel strip in synchronization with the timing of the vertical movement of the punching apparatus (die apparatus). Even when a plurality of dispense nozzles are provided, a precisely constant amount of the adhesive is applied to the thin steel strip because the distances between the upper or lower surface of the thin steel strip and the tips of the dispense nozzles are all the same. The amount of the adhesive applied to the thin steel strip can be determined or adjusted without the need of disassembly of the die apparatus. According to the third aspect of the present invention, if necessary, the thin steel strip can be raised or lowered so as to move away from the dispense nozzle (s) by a means capable of raising and lowering the thin steel strip without raising or lowering the adhesive container to prevent the application of the adhesive to the upper or lower surface of the thin steel strip. According to the first and third aspects of the present invention, the thin steel strip is able to be easily moved away from the adhesive container because there is nothing that restrains the raising or lowering of the thin steel strip. According to the fourth aspect of the present invention, the adhesive dispensed from a plurality of dispense nozzles is stably applied to the upper or lower surface of the thin steel strip. According to the fifth aspect of the present invention, the distance between the upper or lower surface of the thin steel strip and the end face of the adhesive container can easily be adjusted by raising or lowering the adhesive container together with the means capable of raising and lowering the thin steel strip using an elevating device capable of raising and lowering the adhesive container together with the means capable of raising and lowering the thin steel strip. According to the sixth aspect of the present invention, since the adhesive container is located outside the die apparatus, heating of the adhesive with a heating element for enhancement of the fluidity of the adhesive has no thermal influence on the die apparatus, and simultaneously, the adhesive is also not thermally affected by the die apparatus, thereby allowing stable application of the adhesive dispensed from the dispense nozzle(s) to the thin steel strip.

BRIEF DESCRIPTION OF DRAWINGS

FIG. 1 is a schematic configuration diagram of an embodiment including the adhesive application device of the present invention and other devices placed in-line before and after the adhesive application device.

FIG. 2 is an enlarged perspective view of an embodiment including the adhesive application device of the present invention and other devices placed in-line after the adhesive application device.

FIG. 3 is an enlarged cross-sectional front view showing an operating state of an embodiment of the adhesive application device of the present invention.

FIG. 4 is an enlarged cross-sectional front view showing another operating state of an embodiment of the adhesive application device of the present invention.

FIG. 5 is an enlarged cross-sectional front view showing another operating state of an embodiment of the adhesive application device of the present invention.

FIG. 6A is a schematic configuration diagram of another embodiment including the adhesive application device of the present invention and other devices placed in-line before and after the adhesive application device. FIG. 6B is a schematic configuration diagram of another embodiment including the adhesive application device of the present invention and other devices placed in-line before and after the adhesive application device.

FIG. 7 is an enlarged cross-sectional front view illustrating an operating state of an embodiment of the adhesive application device of the present invention.

DESCRIPTION OF EMBODIMENTS

Embodiments of the present invention will be described below with reference to the attached drawings. Various alterations and modifications are possible within the technical scope of the present invention.

FIG. 1 is a schematic configuration diagram of an embodiment including the adhesive application device of the present invention and other devices placed in-line before and after the adhesive application device. In the figure, the numeral 1 denotes a coil of a wound thin steel strip 2. The numeral 3 denotes the adhesive application device. The numeral 6 denotes a die apparatus comprising an upper die 4 and a lower die 5. Referring to FIG. 1, the adhesive application device 3 is located immediately before the die apparatus 6. The thin steel strip 2 is drawn from the coil 1, and an adhesive is applied to the lower surface of the thin steel strip 2 with the adhesive application device 3. The thin steel strip 2 is then punched into a predetermined shape in the die apparatus 6, and moved in the direction indicated by the arrow. The adhesive application device 3 is placed immediately before the die apparatus 6 in FIG. 1, but another die apparatus may be placed immediately before the adhesive application device 3. The thin steel strip 2 may be punched into a predetermined shape in said another die apparatus, then an adhesive may be applied to the lower surface of the thin steel strip 2 with the adhesive application device 3, and the thin steel strip 2 may further be punched into a predetermined shape in the die apparatus 6.

Referring to FIG. 6A, the adhesive application device 3 and the die apparatus 6 shown in FIG. 1 may be disposed in a press apparatus surrounded by frames 21a, 21b, 21c and 21d. In the same manner as above, the thin steel strip 2 may be drawn from the coil 1, then an adhesive may be applied to the lower surface of the thin steel strip 2 with the adhesive application device 3, and the thin steel strip 2 may be punched into a predetermined shape in the die apparatus 6 and moved in the direction indicated by the arrow. In this configuration, the upper die 4 is held on a mounting table 22a, and the lower die 5 and the adhesive application device 3 are held on a mounting table 22b. The adhesive application device 3 is disposed below the thin steel strip 2 in FIG. 6A, but the adhesive application device 3 can be disposed above the thin steel strip 2 depending on the viscosity and supply pressure of the adhesive, as shown in FIG. 6B. In particular, as described in the paragraph below beginning with "The adhesive is not continuouslt applied . . . ," surface of the thin steel strip 2 in synchronization with the timing of punching of the thin steel strip 2 into a predetermined shape by lowering the upper die 4 toward the lower die 5. In the configuration where the adhesive application device 3 is disposed above the thin steel strip 2, the adhesive application device 3 can be held on the mounting table 22a with its dispense nozzles 18 (see FIGS. 3, 4 and 5) facing downward as shown in FIG. 6B so that the adhesive application device 3 can be lowered toward the lower die 5 in synchronization with the lowering movement of the upper die 4. By employing this configuration, an adhesive can be applied to the upper surface of the thin steel strip 2 in synchronization with the timing of punching the thin steel strip 2 into a predetermined shape. The reason why this configuration is possible is that the adhesive used in the present invention has a certain viscosity so as not to flow freely like water. In other words, the adhesive used in the present invention has characteristics similar to the so-called thixotropy. Hence, even when the adhesive application device 3 is disposed above the thin steel strip 2 as shown in FIG. 6B, the adhesive does not drip down. Thus, the adhesive can be applied to the upper surface of the thin steel strip 2 in the same manner as in the adhesive application to the lower surface of the thin steel strip 2, in synchronization with the timing of punching of the thin steel strip 2 into a predetermined shape in the die apparatus 6, as described in this paragraph.

FIG. 2 is an enlarged perspective view of an embodiment including the adhesive application device of the present invention and other devices placed in-line after the adhesive application device. In the figure, the numeral 7 denotes a tank for storing the adhesive. The adhesive is constantly supplied at a predetermined pressure through a hose 7a to an adhesive dispense unit having dispense nozzles for dispensing the adhesive (described later). The numeral 8 denotes an adhesive container that accommodates the adhesive dispense unit. The numeral 9 denotes lift pins capable of raising and lowering the thin steel strip 2 (a means capable of raising and lowering only the thin steel strip without raising or lowering the adhesive container). The numeral 10 denotes a first elevating device. The numeral 11 denotes a rectangular container that holds a slide block unit inside.

FIG. 3 is an enlarged cross-sectional front view showing an operating state of an embodiment of the adhesive application device of the present invention. The adhesive container 8, the lift pins 9 and the rectangular container 11 can be raised and lowered by rotating a knob 10a of the first elevating device 10, as shown in FIG. 3. The slide block unit held in the rectangular container 11 comprises a first slide block 12a positioned on the upper side of the unit and a second slide block 12b positioned on the lower side of the unit. The second slide block 12b positioned on the lower side of the unit is connected to a slide piece 13, which is connected to a rod 14. The rod 14 can be advanced and retracted in the cylinder 15. The advancement and retraction of the rod 14 in the cylinder 15 can be achieved by supplying compressed air at an appropriate pressure from a pneumatic pressure source to the opening 15a or supplying a pressure oil at an appropriate pressure from a hydraulic pressure source to the opening 15a. The numeral 16 denotes a second elevating device for raising and lowering the cylinder 15 to align the vertical position of the lower surface of the cylinder 15 and the lower surface of the second slide block 12b. The alignment of the vertical position of the lower surface of the cylinder 15 and the lower surface of the second slide block 12b can be achieved by raising or lowering the cylinder 15 by rotating the knob 16a.

Referring to FIG. 5, when the rod 14 is advanced in the cylinder 15 to pull the second slide block 12b to the left-hand side in the figure, the first slide block 12a ascends a slope 17, on which the first slide block 12a is in contact with the second slide block 12b. As a result, the lift pins 9 supported by the first slide block 12a are raised, which raises the thin steel strip 2. In this manner, the lift pins 9 can raise and lower the position of the thin steel strip 2 without moving the position of the adhesive container 8.

Referring to FIG. 3, the numeral 18 denotes dispense nozzles for dispensing the adhesive. The dispense nozzles 18 are disposed inside the adhesive container 8 to be spaced apart from the end face of the adhesive container 8 as shown in FIGS. 3, 4 and 5. The adhesive dispense unit that accommodates the dispense nozzles 18 is fixed to the adhesive container 8. The number of the dispense nozzles 18 is six in this embodiment, but needless to say, is not limited thereto. The adhesive stored in the tank 7 can be supplied through the hose 7a to an adhesive pool 19 at a predetermined pressure, and can be stably dispensed from the six dispense nozzles 18 in an equal quantity. The six dispense nozzles 18 communicate with the adhesive pool 19. The numeral 20 denotes an electric heater for heating the adhesive to a predetermined temperature. The electric heater is connected with a power source (not shown in the figure) and is disposed in the inner periphery of the adhesive container 8 so as to surround the dispense nozzles 18. By heating the adhesive with the electric heater 20, the fluidity of the adhesive in the adhesive container 8 can be enhanced and the adhesive can be stably dispensed from the dispense nozzles 18. Since the adhesive container 8 is located outside the die apparatus 6, the temperature rise by the electric heater 20 has no influence on the die apparatus, and simultaneously, temperature changes in the die apparatus have no influence on the fluidity of the adhesive.

A method for applying an adhesive to a thin steel strip using the adhesive application device configured as described above will be described below.

The thin steel strip 2 is drawn from the coil 1, then an adhesive is applied to the thin steel strip 2 with the adhesive application device 3, and the thin steel strip 2 is punched into a predetermined shape in the die apparatus 6, as shown in FIG. 1. This process will be described in detail below.

The adhesive is not continuously applied to the thin steel strip 2, but is rather applied to the thin steel strip 2 in synchronization with the timing of punching of the thin steel strip 2 into a predetermined shape by lowering the upper die 4 toward the lower die 5 in the configuration as shown FIG. 1. In particular, when referring to FIG. 3, at the timing when punching is not performed, a predetermined distance (about several millimeters) is provided between the thin steel strip 2 and the upper surface of the adhesive container 8, which is at the same height as the tops of the lift pins 9. In the configuration shown in FIG. 1, at the timing when the upper die 4 is lowered toward the lower die 5 to punch the thin steel strip 2 into a predetermined shape, the thin steel strip 2 is pressed downward to the lower die 5, and the lower surface of the thin steel strip 2 is brought into abutment with the upper surface of the adhesive container 8, as shown in FIGS. 4 and 7. The adhesive stored in the tank 7 is supplied through the hose 7a to adhesive pool 19 at a predetermined pressure, and is constantly dispensed from the dispense nozzles 18. The vertical distance between the upper surface of the adhesive container 8 and the tips of dispense nozzles 18 is constant, and at the time of the punching, the distance between the tips of the dispense nozzles 18 and the lower surface of the thin steel strip 2 that is brought into abutment with the upper surface of the adhesive container 8 is also constant. Due to this configuration, the amount of the adhesive that rises on the dispense nozzles 18 is substantially constant. In this manner, a substantially constant amount of the adhesive is applied to the lower surface of the thin steel strip 2.

After the adhesive is applied to the lower surface of the thin steel strip 2 as described above, the thin steel strip 2 is punched into core sheets with a predetermined shape. The produced core sheets are stacked together within the lower die 5. After the stacked core sheets reach a predetermined number, the stacked core sheets are dispensed from the lower die 5 to give a laminated core. The laminated core dispensed from the lower die 5 is subjected to a given post-treatment such as heating, and used for assembly of electric parts. In this embodiment, the adhesive is applied to the lower surface of the thin steel strip 2, and therefore care should be taken to prevent the application of the adhesive to the core sheet to be positioned at the bottom of the stacked core sheets of a predetermined number in a single lot dispensed from the lower die 5. Accordingly, to prevent the application of the adhesive to the first core sheet produced by punching in each lot, the configuration as shown in FIG. 5 is employed in which, when the rod 14 is advanced in the cylinder 15 to pull the second slide block 12b to the left-hand side in the figure, the first slide block 12a ascends the slope 17, on which the first slide block 12a is in contact with the second slide block 12b. As a result, the lift pins 9 supported by the first slide block 12a are raised, which raises the thin steel strip 2. Consequently, the distance between the lower surface of the thin steel strip 2 and the tips of the dispense nozzles 18 becomes greater than that shown in FIG. 4, and the adhesive that rises on the dispense nozzles 18 is prevented from being applied to the lower surface of the thin steel strip 2. In this configuration, all that is necessary is to move the lower surface of the thin steel strip 2 away from the tips of dispense nozzles 18, and therefore the degree of elevation of the lift pins 9 does not need to be highly accurately adjusted.

In order to ensure that the adhesive is applied to the lower surface of the core sheets except for the first core sheet to be positioned at the bottom of the stacked core sheets in each lot, immediately after part of the thin steel strip 2 that is to be punched to give the first core sheet in each lot is passed through the adhesive application device 3, the rod 14 is moved to the right-hand side in the figure so as to retract from the cylinder 15. The second slide block 12b is then pushed by the rod 14 to the right-hand side in the figure, and the first slide block 12a descends the slope 17, on which the first slide block 12a is in contact with the second slide block 12b. As a result, the adhesive application device is returned to the original position where the distance between the thin steel strip 2 and the upper surface of the adhesive container 8, which is at the same height as the tops of lift pins 9, is set at a predetermined value, as shown in FIG. 3.

Before the punching of the thin steel strip 2, the knob 10a is rotated to raise or lower the adhesive container 8 together with the lift pins 9 and the rectangular container 11 by an appropriate distance, so that the lower surface of the thin steel strip 2 is brought into abutment with the upper surface of the adhesive container 8 as shown in FIG. 4 to successfully apply the adhesive dispensed from the dispense nozzles 18 to the lower surface of the thin steel strip 2 in synchronization with the timing of punching of the thin steel strip 2. In place of the first elevating device 10, a height adjustment plate can also be used to raise or lower the adhesive container 8 together with the lift pins 9 and the rectangular container 11 by an appropriate distance.

In order to prevent the application of the adhesive to the first core sheet produced by punching in each lot of the core sheets to be dispensed from the lower die 5, the lift pins 9 are raised to raise the thin steel strip 2 as shown in FIG. 5, thereby preventing the application of the adhesive that rises on the dispense nozzles 18 to the lower surface of the thin steel strip 2. Accordingly, to successfully perform the movement as described in the paragraph above beginning with "Referring to FIG. 5," the knob 16a is rotated to raise or lower the cylinder 15 to align the vertical position of the lower surface of the cylinder 15 and the lower surface of the second slide block 12b.

A feature of the present invention is that the distance between the lower surface of the thin steel strip and the tips of the adhesive dispense nozzles is kept constant at the timing of punching of the thin steel strip. This distance is kept constant without the fear of wear, shifting or other problems over time. This feature will be described below. In the adhesive application device of the present invention, the adhesive dispense unit is fixed to the adhesive container, and the adhesive dispense nozzles are disposed inside the adhesive container to be spaced apart from the end face of the adhesive container, and the device comprises a means capable of raising and lowering the thin steel strip without raising or lowering the adhesive container. Due to this configuration, the dispense nozzles (that are disposed inside the adhesive container to be spaced apart from the end face of the adhesive container) are located at a constant distance from the surface of the thin steel strip that is brought into abutment with the end face of the adhesive container, and thus a substantially constant amount of the adhesive dispensed from the dispense nozzles is applied to the thin steel strip when the thin steel strip is brought into abutment with the adhesive container, in synchronization with the timing of punching the thin steel strip into a predetermined shape. Simultaneously, care should be taken to prevent the application of an unnecessary adhesive to the thin steel strip, as described in the paragraph above beginning with "After the adhesive is applied to the lower surface . . . ." For achieving this, the device is provided with a means capable of raising and lowering the thin steel strip without raising or lowering the adhesive container, as described in the paragraph above beginning with "Referring to FIG. 5." Due to this means, the thin steel strip is able to be raised or lowered without raising or lowering the adhesive container to prevent the application of an unnecessary adhesive to the thin steel strip. In this manner, two separate functions are provided as an important feature of the invention: one is the function of keeping a constant distance between the tips of the adhesive dispense nozzles and the surface of the thin steel strip when the adhesive is applied to the thin steel strip; and the other is the function of moving the thin steel strip away from the adhesive dispense nozzles to prevent the application of the adhesive to the thin steel strip.

If the above two functions (one is the function of keeping a constant distance between the tips of the adhesive dispense nozzles and the surface of the thin steel strip when the adhesive is applied to the thin steel strip; and the other is the function of moving the thin steel strip away from the adhesive dispense nozzles to prevent the application of the adhesive to the thin steel strip, as described in the previous paragraph are not separated, the distance between the lower surface of the thin steel strip and the tips of the dispense nozzles will depend on the engagement between cam surfaces, as in the configuration described in Patent literature 4. As a result, if wear occurs on the cam surfaces, or if the adhesive introducing block 43 is slightly inclined, the distance between the tips of the dispense nozzles and the lower surface of the thin steel strip cannot be kept constant. On the contrary, even if wear occurs the cam surfaces in the present invention, the wear may only affect the degree of elevation of the lift pins 9, which have the function of moving the thin steel strip away from the adhesive container. However, the degree of elevation of the lift pins 9 does not need to be highly accurately adjusted, as described in the paragraph above beginning with "After the adhesive is applied to the lower surface." In addition, the adhesive application device has no movable parts that may cause wear between the dispense nozzles 18 and the upper surface of the adhesive container 8, which has the function of keeping a constant distance between the tips of the dispense nozzles 18 and the lower surface of the thin steel strip 2. Due to this configuration, the distance between the tips of the adhesive dispense nozzles 18 and the lower surface of the thin steel strip 2 at the timing of punching of the thin steel strip 2 is kept constant without the fear of wear, shifting or other problems over time.

If the adhesive application device is mounted in the die apparatus, the thin steel strip cannot be easily raised or lowered because the movement of the thin steel strip is restricted by other various parts or devices in the die apparatus.

INDUSTRIAL APPLICABILITY

The adhesive application device of the present invention is applicable to the production of laminated cores for stepper motors or motor cores.

REFERENCE SIGNS LIST

1 Coil
2 Thin steel strip
3 Adhesive application device
4 Upper die
5 Lower die
6 Die apparatus
7 Tank
8 Adhesive container
9 Lift pins
10 First elevating device
10a Knob
11 Rectangular container
12a First slide block 12b Second slide block
13 Slide piece
14 Rod
15 Cylinder
15a Opening
16 Second elevating device
16a Knob
17 Slope
18 Dispense nozzles
19 Adhesive pool
20 Electric heater
21a, 21b, 21c, and 21d Frames
22a and 22b Mounting tables

The invention claimed is:

1. A device for applying an adhesive to a thin steel strip that is to be punched into core sheets with a predetermined shape in a die apparatus to stack and bond core sheets together, the device comprising
an adhesive dispense unit comprising a dispense nozzle for dispensing an adhesive to an adhesive application surface of a thin steel strip,
an adhesive container that accommodates the adhesive dispense unit, and
an adhesive supply unit for supplying the adhesive at a predetermined pressure to the adhesive dispense unit,
wherein the adhesive dispense unit is fixed to the adhesive container,
wherein the dispense nozzle for dispensing the adhesive is disposed inside the adhesive container to be spaced apart from an end face of the adhesive container that is brought into abutment with the adhesive application surface of the thin steel strip,
wherein the adhesive application is performed immediately before the die apparatus, and
wherein the thin steel strip is brought into abutment with the adhesive container, and the adhesive dispensed from the dispense nozzle is applied to the thin steel strip in synchronization with the timing of punching of the thin steel strip into core sheets with a predetermined shape in the die apparatus, and
wherein the adhesive dispense unit is fixed to the adhesive container, and
which comprises a means capable of raising and lowering the thin steel strip without raising or lowering the adhesive container to prevent an unnecessary adhesive from being applied to the thin steel strip.

2. The adhesive application device according to claim 1, wherein the adhesive container is disposed above or below the thin steel strip.

3. The adhesive application device according to claim 1, wherein the adhesive container comprises a plurality of dispense nozzles, and an adhesive pool that communicates with the plurality of dispense nozzles.

4. The adhesive application device according to claim 1, which further comprises an elevating device configured to raise and lower the adhesive container together with the means capable of raising and lowering the thin steel strip.

5. The adhesive application device according to claim 1, wherein the adhesive container comprises a heating element.

6. A method for applying an adhesive to a thin steel strip that is to be punched into core sheets with a predetermined shape in a die apparatus to stack and bond core sheets together, wherein the adhesive application is performed with a device comprising
an adhesive dispense unit comprising a dispense nozzle for dispensing an adhesive to an adhesive application surface of a thin steel strip,
an adhesive container that accommodates the adhesive dispense unit,
an adhesive supply unit for supplying the adhesive at a predetermined pressure to the adhesive dispense unit, and
a means capable of raising and lowering the thin steel strip without raising and lowering the adhesive container to prevent an unnecessary adhesive from being applied to the thin steel strip,
wherein the adhesive dispense unit is fixed to the adhesive container, and
wherein the dispense nozzle for dispensing the adhesive is disposed inside the adhesive container to be spaced apart from an end face of the adhesive container that is brought into abutment with the adhesive application surface of the thin steel strip,
the method comprising
bring the thin steel strip into abutment with the adhesive container, and applying the adhesive dispensed from the dispense nozzle to the thin steel strip immediately before the die apparatus in synchronization with the timing of punching of the thin steel strip into core sheets with a predetermined shape in the die apparatus.

7. The adhesive application device according to claim 2, wherein the adhesive container comprises a plurality of dispense nozzles, and an adhesive pool that communicates with the plurality of dispense nozzles.

8. The adhesive application device according to claim 2, which further comprises an elevating device configured to raise and lower the adhesive container together with the means capable of raising and lowering the thin steel strip.

9. The adhesive application device according to claim 2, wherein the adhesive container comprises a heating element.

* * * * *